April 26, 1955    H. B. GROW    2,706,887
LIQUID PROPELLANT ROCKET MOTOR
Filed Jan. 23, 1946
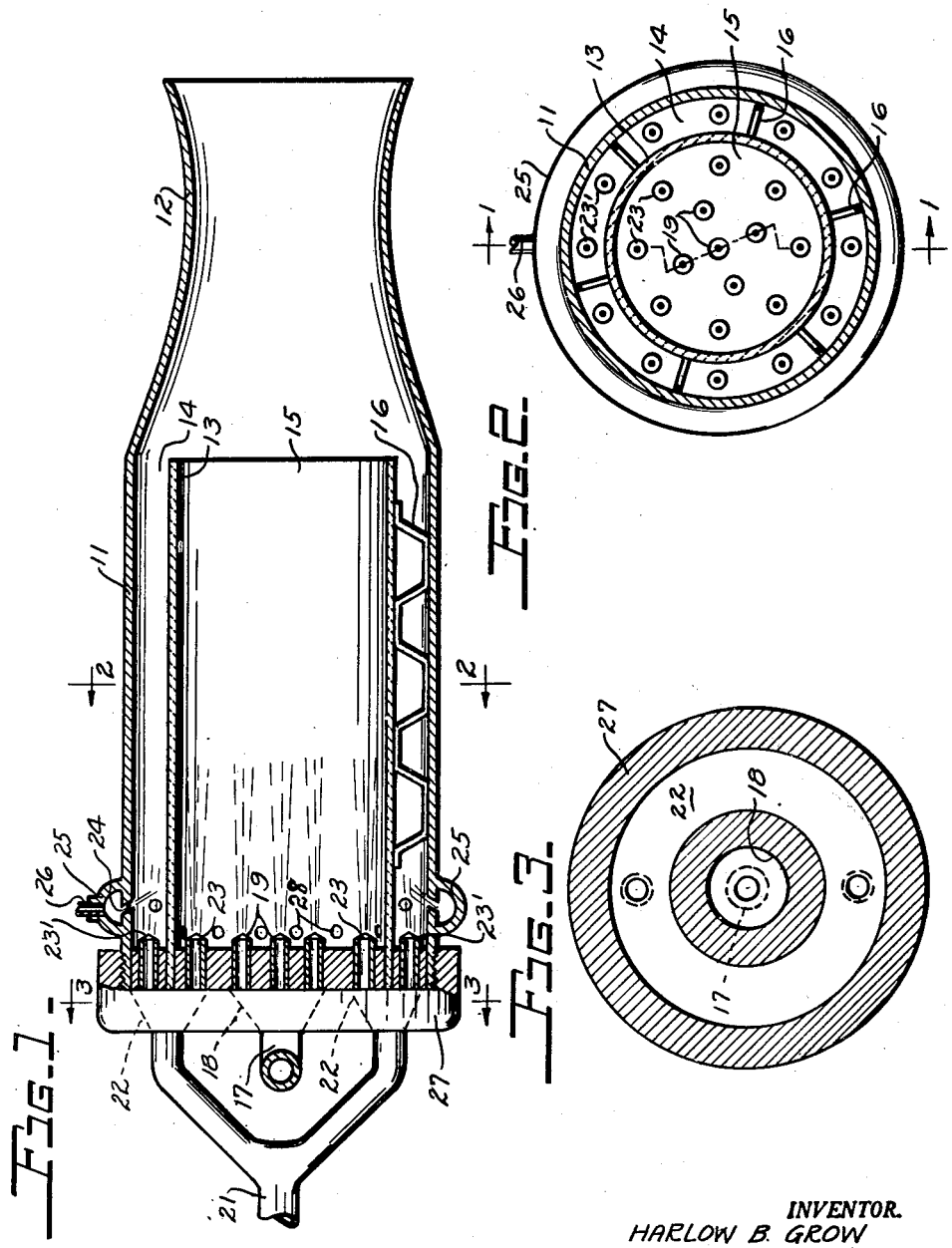
INVENTOR.
HARLOW B. GROW
BY
ATTORNEYS 2,706,887
Patented Apr. 26, 1955

2,706,887

LIQUID PROPELLANT ROCKET MOTOR

Harlow B. Grow, Salt Lake City, Utah

Application January 23, 1946, Serial No. 642,953

2 Claims. (Cl. 60—35.6)

(Granted under Title 35, U. S. Code (1952), sec. 266)

The invention described herein may be manufactured and used by or for the Government for governmental purposes without payment to me of any royalty thereon.

This invention relates to a liquid propellant rocket motor, and more particularly to one having inner and outer burning chambers.

In these liquid propellant rocket motors the temperatures generated, when the propellants are burned efficiently, are so high that the walls of the combustion chambers cannot withstand these high temperatures for any length of time and so burn out. Attempts have been made to improve this defective condition by lining the inner walls of the chambers with refractory material, such as a ceramic inner coating or sleeve, but due to the pressures involved and the differences in expansion between the metallic main chamber and the refractory lining therein the results were not satisfactory. If the ceramic or refractory lining is loose in its contact with the metal wall of the main chamber it cracks, while if it is tight therein it crumbles.

It is an essential object and purpose of this invention to remedy the above noted defects in rocket motors by providing a construction comprising subdivided burning chambers, such chambers preferably including an inner chamber built for burning a high heat producing propellant, and a surrounding outer chamber for burning a low heat producing propellant, so as to prevent the metallic main outer wall and the nozzle of the motor casing from being burned out and destroyed and thus consequently extend the life of the motor.

I have found that by using a cylindrical sleeve or tubular member of refractory material, such as ceramic, positioned within and in spaced relation to the inner side of the conventional tubular metallic combustion chamber, and simultaneously burning a propellant interiorly of the ceramic sleeve having high efficiency and heat characteristics and burning a second propellant in the annular chamber between the exterior of this sleeve and the interior of said metallic chamber wall having somewhat lower efficiency and decidedly lower heat characteristics, a rocket motor is provided in which the very efficient high heat producing propellants may be burned at their maximum efficiency. Since the pressures interiorly and exteriorly of the ceramic sleeve are hereby substantially equalized, this sleeve acts primarily as an insulating sleeve being subjected only to the heat differential between the two types of propellants used. The flow from this annular outer chamber exteriorly around the sleeve in passing out through the expulsion neck to the jet opening will be relatively cool as compared to the combustion gases from the interior of the ceramic sleeve, and it thus constitutes a heat insulating gaseous medium between the inner wall of the metallic main chamber together with its expulsion passage or jet, and the high temperature central gas flow through the central part of this motor, thus preventing extremely hot gases from reaching and burning out the interior of the metal casing and of the rack and jet opening.

These and various other objects and advantages are attained with this invention as will become apparent from the following description, taken in connection with the accompanying drawing wherein the invention is shown in its preferred form, it being apparent that other arrangements and forms of construction may be resorted to in carrying out the objects and purposes of this invention.

In the drawing:

Fig. 1 is a longitudinal sectional view through a rocket motor illustrating my invention, and taken on the line 1—1 of Fig. 2.

Fig. 2 is a cross-sectional view thereof, taken substantially on line 2—2 of Fig. 1.

Fig. 3 is a cross-sectional view thereof, taken on line 3—3 of Fig. 1.

The drawing illustrates my invention in a preferred form of construction wherein the rocket motor comprises a main outer casing 11 having a nozzle or expulsion neck 12 thereon all constructed of metal, being preferably integral and substantially in the form of the conventional rocket. A tubular member or sleeve 13 which is of a refractory or ceramic material is positioned within the casing 11 so as to provide an annular exterior chamber or passageway 14 around the exterior of sleeve 13 and the interior of casing 11, and also provide a main inner burning chamber 15 within the sleeve 13. Said sleeve may be mounted in the casing by means of lugs or ribs 16 extending longitudinally of its exterior. These ribs are arranged and spaced so as to provide free circulation in the annular passageway 14.

A delivery line 17 is provided for delivering propellant liquid through a distributing chamber or compartment 18 and through nozzles 19 leading therefrom into the inner chamber 15. Another delivery line 21 is provided for delivering another propellant ingredient through a distributing chamber or compartment 22, which is shown as an annular channel herein, and therefrom through nozzles 23 into said inner burning chamber 15. The propellant liquid or fuel may be a mixture of nitromethane and alcohol fed through nozzles 19, and hydrogen peroxide fed through nozzles 23. This mixture provides the conventional combustible rocket propellant, which herein is sprayed into the main inner burning chamber 15 at an optimum mixture ratio of high heat producing value. The high temperature combustion which takes place in the inner burning chamber 15 makes use of nitromethane and alcohol as fuels, with the hydrogen peroxide supplying the required oxygen by dissociation into water and oxygen. This process, which may develop temperatures up to 2500° C., is started by the heat generated in the annular chamber 14 where a lower temperature reaction takes place. The oxidation reactions occurring in the inner chamber 15 may be expressed by the following chemical equations, where nitromethane is $CH_3NO_2$, alcohol is $C_2H_5OH$, hydrogen peroxide is $H_2O_2$ and $\Delta$ denotes heat:

(1) 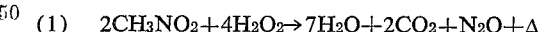
$2CH_3NO_2 + 4H_2O_2 \rightarrow 7H_2O + 2CO_2 + N_2O + \Delta$ (2) 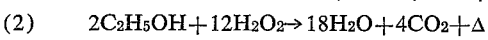
$2C_2H_5OH + 12H_2O_2 \rightarrow 18H_2O + 4CO_2 + \Delta$ The two fuels nitromethane and alcohol may be used in any desired ratio but it is understood that enough hydrogen peroxide must be provided to produce complete combustion of the fuels. The large amount of heat developed is adapted to completely vaporize the water ($H_2O$) resulting from the above reactions. The steam produced in addition to the carbon dioxide ($CO_2$) and the nitrous oxide ($N_2O$) supplies large volumes of gaseous discharge from the inner chamber 15.

A spray of hydrogen peroxide is also fed into the annular chamber 14, and this is readily accomplished by providing nozzles 23' which are extended from the compartment 22 so as to lead into the annular chamber or passageway 14. A catalyst is entered into said annular passageway 14 to mix with the hydrogen peroxide, and this may be done by introducing it through ports 24 extending from an annular container or chamber 25 positioned around the casing 11, this chamber being fed by a feed line 26. Said catalyst may be sodium permanganate. This mixture of hydrogen peroxide with the catalyst of sodium permanganate produces a relatively low temperature reaction, as compared to the high temperature reaction occurring in the main inner chamber 15 by the mixture of hydrogen peroxide with nitromethane and alcohol. The low temperature reaction involves the breaking down of hydrogen peroxide into water and oxygen, which reaction is hastened by the permanganate catalyst. The temperature produced by the reaction may be as high as 600° C. and the heat generated is sufficient to start the high temperature reactions in the inner chamber 15. Thus no special firing devices are needed in the present rocket motor. The reaction occurring in the annular chamber 14 may be expressed by the following chemical equation where hydrogen peroxide is $H_2O_2$, sodium permanganate is $NaMnO_4$ and $\Delta$ denotes heat:

(3)  $2H_2O_2 + NaMnO_4 \rightarrow 2H_2O + O_2 + NaMnO_4 + \Delta$

The free oxygen produced by this reaction is available for use as a gaseous propellant and will be produced at the rate of about six pounds for every four pounds of water ($H_2O$). While heat is developed as a result of the reaction or dissociation it is dissipated at a steady rate by the flow of the free oxygen and water vapor from the annular chamber 14. Part of the developed heat is available for heating and vaporizing the water remaining after the hydrogen peroxide has broken down as explained above. Since the temperature of the reaction in the annular chamber 14 is sufficient to start the combustion process occurring in the inner chamber 15, the low temperature reaction is started first so as to function as an igniter for the high temperature reaction.

These supply chambers 18 and 22, with the nozzles 19, 23 and 23' extending therefrom, may be provided in a head member or block 27 which is threaded or otherwise suitably fastened on the casing 11, and the delivery lines 17 and 21 are connected to said head members, as indicated in the drawing for example.

It should be noted that the annular spray of hydrogen peroxide through the jets 23' and the introduction of the catalyst through the ports 24 are together directed into the annular chamber 14, so that their mixing will occur in this annular passageway and thus produce a low temperature reaction therein; while the admixture of the hydrogen peroxide and the nitromethane and alcohol takes place within the inner ceramic chamber 15, thereby providing a high inner temperature and high thrust producing central gas core. Apertures 28 may also be provided in the sleeve 13, adjacent its injector and, so that any excessive pressure set up in either the inner or the outer combustion chamber (15, 14) can be relieved or compensated for and readily equalized thereby.

By this disclosed construction the outer metallic chamber wall and the nozzle are protected from the high temperature produced by the combustion in the main inner chamber 15, while the inner sleeve is heated from two sides and is subjected to substantially the same pressure at both the inner and the outer faces of its wall. The gases passing through the nozzle also have a relatively cool outer film which is in contact with the nozzle proper, and have a high temperature high thrust producing central gas core. The metal components of the rocket motor are hereby protected from excessive temperatures and a ceramic material may be used herein for the inner sleeve 13, because of the favorable arrangement of the inwardly spaced sleeve and the resultant favorable temperature and pressure conditions. This arrangement of rocket motor, having the pressure substantially equal on the inner and the outer face of the inner sleeve 13, also permits the use of a low mechanical strength ceramic material.

I claim:

1. A rocket motor comprising an outer casing provided at one end with a nozzle, a tubular member mounted in spaced relation within said outer casing to provide a narrow annular outer reaction chamber and passageway between said outer casing and said tubular member and to further provide an inner reaction chamber within said tubular member open at the end adjacent to said nozzle, a plurality of apertures in said tubular member near the end remote from said nozzle to equalize the pressures within said outer and inner reaction chambers, means for introducing a liquid reacting medium and a catalyst into said outer reaction chamber to admix therein and provide a low heat producing gaseous propellant, and means for spraying liquid fuel and liquid oxidizing agent into said inner reaction chamber and thus provide upon combustion of said liquid fuel a high heat producing gaseous propellant, thereby providing large volumes of gaseous propellants for steady flow from said chambers into and through said nozzle, with a layer of low temperature gaseous propellant adjacent to the casing wall to protect said wall from the excessive heat of the high temperature gaseous propellant flowing from said inner reaction chamber while at the same time providing a high temperature and high thrust producing gaseous core.

2. A rocket motor as defined in claim 1, wherein said outer casing is made of a metallic material and said tubular member is made of a ceramic material and further including means to provide uniform spacing between said outer casing and said tubular member throughout the length thereof.

References Cited in the file of this patent

UNITED STATES PATENTS

| 1,897,092 | Weir | Feb. 14, 1933 |
| 2,074,098 | Adams | Mar. 16, 1937 |
| 2,325,618 | Lysholm | Aug. 3, 1943 |

FOREIGN PATENTS

| 538,133 | France | Mar. 14, 1922 |

OTHER REFERENCES

Journal of the American Rocket Society, No. 65, March 1946, page 3.